United States Patent
Liu et al.

(10) Patent No.: US 11,584,979 B2
(45) Date of Patent: *Feb. 21, 2023

(54) OXIDE DISPERSION-STRENGTHENED IRON-BASED ALLOY POWDER AND CHARACTERIZATION METHOD THEREOF

(71) Applicant: CENTRAL SOUTH UNIVERSITY, Hunan (CN)

(72) Inventors: Zuming Liu, Hunan (CN); Quan Li, Hunan (CN); Boyun Huang, Hunan (CN); Xueqian Lv, Hunan (CN); Kai Peng, Hunan (CN); Fan Zhao, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/263,559

(22) PCT Filed: Aug. 30, 2018

(86) PCT No.: PCT/CN2018/103117
§ 371 (c)(1),
(2) Date: Jan. 27, 2021

(87) PCT Pub. No.: WO2020/019402
PCT Pub. Date: Jan. 30, 2020

(65) Prior Publication Data
US 2021/0147965 A1 May 20, 2021

(30) Foreign Application Priority Data
Jul. 27, 2018 (CN) .......................... 201810845463.6

(51) Int. Cl.
*C22C 32/00* (2006.01)
*B22F 9/04* (2006.01)
(Continued)

(52) U.S. Cl.
CPC .......... *C22C 32/0026* (2013.01); *B22F 1/052* (2022.01); *B22F 9/04* (2013.01);
(Continued)

(58) Field of Classification Search
None
See application file for complete search history.

(56) References Cited

U.S. PATENT DOCUMENTS

2011/0142711 A1* 6/2011 Ukai ..................... C22C 19/007
420/441

FOREIGN PATENT DOCUMENTS

CN 105154756 12/2015
CN 105239010 A * 1/2016
(Continued)

OTHER PUBLICATIONS

Oksiuta et al. Influence of hot rolling and high speed hydrostatic extrusion on the microstructure and mechanical properties of an ODS RAF steel. Journal of Nuclear Materials 409 (2011) 86-93. (Year: 2011).*
(Continued)

*Primary Examiner* — Paul A Wartalowicz
*Assistant Examiner* — Stephani Hill
(74) *Attorney, Agent, or Firm* — JCIPRNET

(57) ABSTRACT

An oxide dispersion-strengthened (ODS) iron-based alloy powder and a characterization method thereof are provided. The alloy powder comprises a matrix and strengthening phases. The strengthening phases include at least two types of strengthening phase particles with different sizes, wherein a volume of the particles with a particle size of less than or equal to 50 nm accounts for 85-95% of a total volume of all the strengthening phase particles. The matrix is a Fe—Cr—W—Ti alloy. The characterization method of the ODS iron-based alloy powder comprises separating the strength-
(Continued)

ening phases from the powder matrix through electrolysis, and analyzing and characterizing the strengthening phases using an electron microscope.

3 Claims, 5 Drawing Sheets

(51) Int. Cl.
   *C22C 38/22* (2006.01)
   *C22C 38/28* (2006.01)
   *G01N 23/04* (2018.01)
   *B22F 1/052* (2022.01)

(52) U.S. Cl.
   CPC .............. *C22C 38/22* (2013.01); *C22C 38/28* (2013.01); *G01N 23/04* (2013.01); *B22F 2009/043* (2013.01); *B22F 2201/10* (2013.01); *B22F 2301/35* (2013.01); *B22F 2302/25* (2013.01)

(56) References Cited

FOREIGN PATENT DOCUMENTS

| | | |
|---|---|---|
| CN | 106825587 | 6/2017 |
| CN | 108950357 | 12/2018 |
| JP | H01275724 | 11/1989 |

OTHER PUBLICATIONS

Xu et al. Effect of milling parameters on mechanical alloying of ODS austenitic steels. Cailiao Kexue Yu Gongyi. (2010), 18(2), 187-191. STN abstract. (Year: 2010).*

Mandal et a. Optimizing of milling parameters for the mechanosynthesis of nanocrystalline hydroxyapatite. Powder Technology 253 (2014) 650-656. (Year: 2014).*

Zhang et al. Influence of ball size distribution on grinding effect in horizontal planetary ball mill. Advanced Powder Technology 25 (2014) 983-990. (Year: 2014).*

Klueh et al. Oxide dispersion-strengthened steels: A comparison of some commercial and experimental alloys. Journal of Nuclear Materials 341 (2005) 103-114. (Year: 2005).*

CN 105239010 machine translation (Year: 2016).*

Park et al. Phase evolution and formation process of compound during ball milling of a mixture of Ti and B powders. J. Japan Inst. Metals, vol. 57, No. 8 (1993), pp. 952-956. (Year: 1996).*

J.R. Rieken et al., "Reactive gas atomization processing for Fe-based ODS alloys", Journal of Nuclear Materials, Sep. 2012, pp. 65-75.

Xu Yan-Long et al., "Preparation ofMgO dispersion strengthening ferrous materialsby internal oxidation", Materials Science and Engineering of PowderMetallurgy, Jun. 2015, pp. 431-437.

Behnoush Dousti et al., "Microstructural evolution and chemical redistribution in Fe—Cr—W—Ti—Y2O3 nanostructured powders prepared by ball milling", Journal of Alloys and Compounds, Jun. 2013, pp. 409-416.

"International Search Report (Form PCT/ISA/210) of PCT/CN2018/103117" dated Apr. 24, 2019, with English translation thereof, pp. 1-4.

* cited by examiner

OXIDE DISPERSION-STRENGTHENED IRON-BASED ALLOY POWDER AND CHARACTERIZATION METHOD THEREOF

CROSS-REFERENCE TO RELATED APPLICATION

This application is a 371 of international application of PCT application serial no. PCT/CN2018/103117, filed on Aug. 30, 2018, which claims the priority benefit of China application no. 201810845463.6, filed on Jul. 27, 2018. The entirety of each of the above mentioned patent applications is hereby incorporated by reference herein and made a part of this specification.

TECHNICAL FIELD

The present disclosure relates to an oxide dispersion-strengthened (ODS) iron-based alloy powder and a characterization method thereof, and belongs to the field of powder metallurgy materials.

BACKGROUND

Oxide dispersion-strengthened (ODS) alloy powder is the raw material for preparing ODS alloy, and its microstructure, especially the size distribution, morphology, and crystal structure of strengthening phases plays a crucial effect on performance of ODS alloys. ODS alloy powder with a homogeneous microstructure, oxide dispersion distribution, multi-scale and multi-structure is a key to prepare the high-performance ODS alloy.

Rieken, et al. [J. R. Rieken, et al. Journal of nuclear materials 2012, 428(1-3): 65-75] used mixed Ar-$O_2$ gas to prepare ODS alloy powder by reactive gas atomization, and found that a Cr-containing oxidation layer of about 50 nm was formed on the powder surface but no oxide strengthen phases were formed in the matrix of alloy powder. Based on internal oxidation method, Xu et al. [Xu Yanlong et al., Materials Science and Engineering of Powder Metallurgy, 2015, 20(3):431-437] prepared MgO dispersion-strengthened iron-based alloy, but only obtained the single MgO strengthening phase with particle size larger than 1 μm, and maximum tensile strength of the alloy is 342 MPa at room temperature. Dousti et al. [Behnoush Dousti, et al. Journal of Alloys and Compounds, 2013, 577(2): 409-416] reported that elemental metal Fe, Cr, W, and Ti powder and $Y_2O_3$ powder were mixed and mechanical alloyed, and results show that the metal elements are difficult to be homogeneous dispersed, and the $Y_2O_3$ particles were coarse, and no new oxide strengthening phase was formed. Totally, alloy powders prepared through various ways such as reaction gas atomization, internal oxidation and mechanical alloying have the same problems in which the oxides are coarse and inhomogeneous distributed. Therefore, it is difficult to obtain the alloy powder with oxide dispersion distribution in the powder matrix, which results in that the properties of the alloy prepared by hot forming are difficult to meet the requirements of engineering application.

Traditionally, optical microscope (OM) and scanning electron microscope (SEM) were able to characterize the microstructure of alloy powder in micron-scale. However, those equipment are unable to characterize the nano-scaled strengthening phase such as oxides particles. Transmission electron microscope (TEM) is suitable for characterizing the submicron-scaled and nano-scaled oxide particles in alloy powder. However, transmission electron microscopy (TEM) has a extremely high requirements for the TEM samples, and because ferromagnetic alloy powder will seriously pollute and damage the electron microscope, it is difficult to directly characterize the ferromagnetic alloys or alloy powder by TEM/HRTEM. Therefore, preparing TEM/HRTEM samples of ferromagnetic alloy powder and characterizing its nano-scaled phase structure become the key problem to investigate microstructure of the ferromagnetic alloy powder.

Aiming at the above problems, the present disclosure provides an ODS iron-based alloy powder and a characterization method thereof. The prepared powder is homogeneous in microstructure, where the oxide strengthening phases have multi-scale and multi-structures and homogeneous dispersed in the matrix and are characterized by TEM. The present disclosure proposes a sample preparation method for TEM/HRTEM characterization related to those nano-scale oxide phases. The tensile properties of ODS iron-based alloy prepared using this powder reaches 1600 MPa or above. Currently, no relevant research result has been publicly reported in this field.

The key technical problems encountered during the development of the present disclosure are as follows:

(1) Proposals for Design Idea of Multi-Scale and Multi-Types Oxide Dispersion-Strengthening Phases Oxide dispersion-strengthened (ODS) alloy powder is the raw material for preparing high-performance ODS alloy, and its microstructure, especially the size, morphology and crystalline structure of oxides strengthening phase plays a crucial effect on performance of ODS alloys prepared by powder forming.

During the development of the present disclosure, a variety of solutions have been designed:

Atomized oxygen-containing iron-based alloy powder: a kind of oxygen supersaturated solid solution, the oxygen content and the distribution uniformity of the powder are difficult to control, which results in that the mechanical properties of the alloy prepared by this powder are poor.

Surface-oxidized atomized iron-based alloy powder: Oxides in the alloy prepared by this powder are coarse and inhomogeneous distributed, resulting in poor mechanical properties of the alloy prepared by surface-oxidized atomized iron-based alloy powder.

Oxide dispersion-strengthened iron-based alloy powder prepared by mechanical alloying of atomized iron-based alloy powder and $Fe_2O_3$ powder: The oxides in the ODS alloy prepared by this powder were formed by the replacement reaction between alloying elements and $Fe_2O_3$, which results in $Fe_2O_3$ remained and inhomogeneous distribution of oxides. This leads to a poor oxidation resistance of the prepared alloy.

Nano-oxide dispersed alloy powder has been designed according to the existing oxide dispersion strengthening theory and technical idea of ODS iron-based alloy preparation: Alloy powder with homogeneous distribution of nano-scale $Y_2O_3$ of was prepared by mechanical alloying of rare earth oxide powder, especially $Y_2O_3$ powder, and atomized pre-alloyed iron-based powder. The alloy prepared by this powder has good tensile properties at room temperature, and high strength at 550° C., but the strength performance of the alloy decreases rapidly at the temperature exceeding 600° C.

Based on the alloy strengthening theory and the deformation theory, the ODS alloy design idea of using nano-scale and submicron-scale strengthening phases to strengthen the alloy matrix and grain boundary is proposed for the first time. It is proposed for the first time to use high energy ball milling to introduce high-density defects into $Y_2O_3$, and result to amorphization while $Y_2O_3$ powder was nano-sized, and various phases containing oxygen (including Y—Ti—O, Y—Cr—O and Y—W—O) are formed, which provides conditions for obtaining more stable complex oxides. Then, various complex oxide strengthening phases are formed in alloy matrix, which can effectively improve the high-temperature mechanical properties of ODS alloy.

(2) Preparation of Alloy Powder with Multi-Scale Oxide Strengthening Phases

During the development of the present disclosure, the methods for introducing oxide strengthening phases into alloy powder matrix include: using oxide to participate in reaction, preparing oxygen-containing powder atomized by oxygen-containing gas, and forming oxide strengthening phase by pre-oxidization of the alloy powder surface followed by replacement reaction. However, all these methods are difficult to obtain the required oxide strengthening phases effectively, and it is difficult to control the microstructure, content, size and distribution of the strengthening phases. In addition, the high temperature properties of the alloy prepared by such methods are poor.

Finally, the present disclosure uses $Y_2O_3$ as a strengthening phase raw material to prepare the powder containing homogeneous dispersed multi-scale strengthening oxides by mechanical alloying using milling balls with six diameters.

(3) Preparation of Alloy Powder Containing Homogeneous-Distributed Multi-Scale and Multi-Structure Oxides Strengthening Phases During the development of the present disclosure, milling ball with one single diameter was used for mechanical alloying, and only fine $Y_2O_3$ was obtained in as-milled alloy powder. The present disclosure designs the compatibility between milling balls with various diameters and the ball-to-powder ratio, to obtain high-density defects while $Y_2O_3$ powder was nano-sized, and $Y_2O_3$ undergoes structural transformation and amorphization during mechanical milling. Finally, crystalline $Y_2O_3$ and amorphous $Y_2O_3$ and Y—Ti—O, C—Cr—O, and Y—W—O is obtained, and the alloy powder containing multi-scale and multi-structure strengthening oxide phases is obtained. The key of the above preparation is to control the structure of $Y_2O_3$, especially to obtain amorphous $Y_2O_3$ phase.

(4) The present disclosure is also encountered with the problem that strengthening phases are very difficult to characterize by a transmission electron microscope (TEM) or a high-resolution transmission electron microscope (HR-TEM). As a result, the structure and proportion of oxide strengthening phases with size of 50 nm and below cannot be accurately characterized. Hence, it is impossible to know and/or investigate the influence of the structure and proportion of oxide strengthening phases with size of 50 nm and below on the performance of alloy powder and alloy products prepared by this alloy powder forming. To solve this problem, the present disclosure develops a corresponding characterization method for the first time.

SUMMARY

The present disclosure provides an ODS iron-based alloy powder. The ODS iron-based alloy powder contains a matrix and strengthening phases; the strengthening phases include at least two types of strengthening phase particles with different sizes; the two types of strengthening phase particles with different sizes are particle A and particle B; the size of the particle A is less than or equal to 50 nm, and the size of the particle B is greater than 50 nm and less than or equal to 200 nm; the volume of the particle A accounts for 85-95% of the total volume of all the strengthening phase particles; and content of all strengthening phases is 0.5-3.0 wt. %;

The matrix is a Fe—Cr—W—Ti alloy;

The strengthening phases include crystalline $Y_2O_3$ and/or amorphous $Y_2O_3$, Y—Ti—O, Y—Cr—O and Y—W—O.

Preferably, according to the ODS iron-based alloy powder provided by the present disclosure, the volume of the particle A accounts for 88-93% of the total volume of all strengthening phase particles.

The ODS iron-based alloy powder provided by the present disclosure is prepared by the following steps:

Step 1: weighing a pre-alloyed iron-based powder and a rare earth oxide powder containing $Y_2O_3$ according to a mass ratio of the pre-alloyed iron-based powder to the rare earth oxide powder containing $Y_2O_3$ being (97-99.5):(3-0.5); taking milling balls according to a ratio of the total mass of powder materials to the mass of the milling balls being 1:(10-20), and filling the pre-alloyed iron-based powder, the rare earth oxide powder containing $Y_2O_3$ and the milling balls into a milling can, and sealing the milling can;

Where the milling balls with diameters of 18-22 mm, 14-16 mm, 9-11 mm, 7-8.5 mm, 4.5-5.5 mm and 2.5-3.5 mm are matched according to the mass ratio of (1-2):(1-2):(1-2):(1-2):(1-2):(1-2);

Step 2: Vacuuming the milling can, and then filling with inert gas;

Step 3: Installing the milling can in step 2 to a planetary ball milling machine, and mechanical milling, where mechanical milling parameters are as follows: a milling time of 40-120 hrs, and a milling rotating speed of 300-380 r/min; and Step 4: After the mechanical milling, sieving the powder under an inert gas atmosphere in a glovebox to obtain the ODS powder.

According to the ODS iron-based alloy powder provided by the present disclosure, two gas nozzles are disposed on the lid of the milling can for vacuuming and filling with the inert gas after sealing.

The inert gas is argon.

The ball milling machine is a vertical planetary ball milling machine or an omni-directional planetary ball milling machine. Revolution and rotation directions are changed once per 25-35 min during ball milling.

According to the ODS iron-based alloy powder and characterization method thereof provided by the present disclosure, the particle size of the rare earth oxide powder containing $Y_2O_3$ is less than or equal to 75 μm; and the pre-alloyed iron-based powder is Fe—Cr—W—Ti alloy powder with a particle size of less than or equal to 150 μm.

Preferably, according to the ODS iron-based alloy powder provided by the present disclosure, in step 1, the rare earth oxide powder containing $Y_2O_3$ is $Y_2O_3$ powder.

Preferably, according to the ODS iron-based alloy powder provided by the present disclosure, in step 1, the milling balls with diameters of 20 mm, 15 mm, 10 mm, 8 mm, 5 mm and 3 mm are matched according to the mass ratio of 1:1:1:1:1:1.

According to the ODS iron-based alloy powder provided by the present disclosure, the fabricated ODS iron-based alloy powder is sequentially subjected to hot extrusion, hot rolling and heat treatment to prepare a multi-scale and multi-phase dispersion-strengthened iron-based alloy.

Hot extrusion parameters are as follows: extrusion temperature of 850-1100° C., and an extrusion ratio of (6-15):1.

Hot rolling parameters are as follows: a temperature of 850-1100° C., and total deformation of 60-80%.

Heat treatment parameters are as follows: a temperature of 950-1200° C., holding 1-2 hrs, and air cooling to room temperature.

The tensile strength of the fabricated multi-scale and multi-phase dispersion-strengthened iron-based alloy is over 1600 MPa at room temperature, and over 600 MPa at 700° C., respectively.

A characterization method of the ODS iron-based alloy powder provided by the present disclosure includes the following steps:

Step A: Putting the ODS iron-based alloy powder and foam nickel into a beaker filled with absolute ethanol together, and then dispersing by ultrasonic to obtain foam nickel filled with the ferromagnetic ODS iron-based alloy powder;

Step B: Putting the foam nickel filled with the ODS iron-based alloy powder into an electrolyte, then electrolyzing, to separate the strengthening phases from the iron-based alloy matrix, and then conducting magnetic separation to obtain an electrolyte containing the strengthening phase particles;

Step C: Extracting the electrolyte containing the strengthening phase particles prepared by electrolyzing, and diluting the electrolyte with absolute ethanol to obtain a diluted suspension;

Step D: Dispersing the diluted suspension by ultrasonic to obtain a solution containing nano-scale to submicron-scale strengthening phase particles for use;

Step E: Dripping the solution which contains the nano-scaled to submicron-scaled strengthening phase particles for use onto an ultrathin carbon support film for several times, then drying to obtain a TEM test sample; and Step F: Characterizing the strengthening phase particles of the TEM test sample via an electron microscope.

According to the characterization method of the ODS iron-based alloy powder provided by the present disclosure, in step A, the particle size of the ODS iron-based alloy powder is less than 150 μm; and purity of the foam nickel used in step A is greater than or equal to 99.98%, the pore diameter is less than 200 μm, and ultrasonic dispersion time is 3-5 min.

According to the characterization method of the ODS iron-based alloy powder provided by the present disclosure, the electrolyte used in step B is composed of the following components in percentage by mass: 2%-15% of a substance A, 15%-25% of acetylacetone, 3%-15% of glycerol and the balance being absolute ethanol; the pH value of the electrolyte is 7-9; and the substance A is selected from at least one of tetramethylammonium chloride, tetramethylammonium bromide, hexadecyl trimethyl ammonium chloride, and hexadecyl trimethyl ammonium bromide.

The electrolysis process in step B is as follows: the foam nickel filled with the ODS iron-based alloy powder is used as an anode, and a conductive material containing iron is used as a cathode; and the electrolysis is carried out by applying a constant-voltage of 3-6 V at room temperature for 10-20 min. The conductive material containing iron is selected from one of stainless steel, low-carbon steel and pure iron.

By means of the characterization method designed by the present disclosure, nondestructive separation of a second phase can be achieved.

According to the characterization method of the ODS iron-based alloy powder provided by the present disclosure, in step B, the magnetic separation is conducted on the electrolyte containing the strengthening phase particles using a magnetic field so as to remove magnetic powder particles; and in step C, the electrolyte containing the strengthening phase particles is diluted with absolute ethanol by a factor of 5-10.

According to the characterization method of the ODS iron-based alloy powder provided by the present disclosure, in step D, the ultrasonic dispersion is conducted for 3-5 min.

According to the characterization method of the ODS iron-based alloy powder provided by the present disclosure, in step E, the ultrathin carbon support film is of a three-layer film structure, and the thickness of the carbon film is less than 5 nm.

According to the characterization method of the ODS iron-based alloy powder provided by the present disclosure, in step F, the morphology, microstructure and size of the strengthening phase particles are characterized using a TEM, and the microstructure of nanometer strengthening phase particles is characterized using a HRTEM.

Theoretically, the solution designed by the present disclosure is suitable for HRTEM characterization, and is also suitable for the characterization requirements of all electron microscopes.

According to the characterization method of the ODS iron-based alloy powder provided by the present disclosure, magnification of HRTEM mode is greater than 400 K.

According to the characterization method of the ODS iron-based alloy powder provided by the present disclosure, TEM/HRTEM image and elemental distribution of EDS/EDS-Map results can be obtained simultaneously.

In the present disclosure, SEM represents scanning electron microscope, TEM represents transmission electron microscope, HRTEM represents high-resolution transmission electron microscope, EDS represents energy disperse spectroscopy, and EDS-Map represents element distribution energy disperse spectroscopy.

(1) According to the ODS iron-based alloy powder and the characterization method thereof provided by the present disclosure, through combination of preparation method and characterization technology, the ODS iron-based alloy powder in which the strengthening phases have the characteristics of multi-scale, multi-type, homogeneous-distribution and reasonably configured particle size is obtained.

(2) According to the ODS iron-based alloy powder and the characterization method thereof provided by the present disclosure, the types of oxides strengthening phases in the iron-based alloy powder can be controlled to be crystalline $Y_2O_3$, amorphous $Y_2O_3$, Y—Ti—O, Y—Cr—O and Y—W—O.

(3) According to the ODS iron-based alloy powder and the characterization method thereof provided by the present disclosure, the ultrasonic dispersion is utilized to evenly fill pores of the foam nickel with the ODS iron-based alloy powder, the foam nickel filled with the ODS iron-based alloy powder is used as an anode, and the strengthening phases in the ODS iron-based alloy powder are extracted by electrolyzing. Therefore, the problem that strengthening phases of powder samples cannot be separated through electrolysis is effectively solved.

(4) According to the ODS iron-based alloy powder and the characterization method thereof provided by the present disclosure, various modern analysis and characterization technologies are utilized to characterize in detail the microstructure of the ODS iron-based alloy powder, especially size, morphology, and structure of the multi-scale and multi-type strengthening phases in the powder matrix. Therefore, the problem that nanometer strengthening phases in ferromagnetic ODS iron-based alloy powder are difficult to characterize using a TEM/HRTEM is solved.

(5) According to the ODS iron-based alloy powder and the characterization method thereof provided by the present disclosure, the alloy prepared by hot extrusion, then hot rolling and then heat treatment using the ODS iron-based alloy powder designed and prepared by the present disclosure has the tensile strength of the alloy over 1600 MPa at room temperature and greater than 600 MPa at 700° C., and shows good plasticity, and its comprehensive tensile properties are obviously superior to those of alloys of the same grade and same type.

(6) According to the ODS iron-based alloy powder and the characterization method thereof provided by the present disclosure, the composition and preparation technologies of the powder are optimized depending on the TEM/HRTEM observation results for the first time, which provides essential conditions for optimization design of ODS iron-based alloys with multi-scale and multi-types oxide strengthening phases.

In summary, according to the ODS iron-based alloy powder and the characterization method thereof, through coordinated control of various parameters of mechanical ball milling and the content of $Y_2O_3$, the type, size and distribution dispersion degree of oxides in the alloy powder can be controlled effectively; and an ODS powder with strengthening phases of a size in a range of a few nanometers to a few hundred nanometers and of types including crystalline $Y_2O_3$, amorphous $Y_2O_3$, Y—Ti—O, Y—Cr—O and Y—W—O can be prepared. The tensile strength of the alloy prepared by hot forming of the above alloy powder prepared by the present disclosure is over 1600 MPa at room temperature and 600 MPa at 700° C. The prepared alloy has the good plasticity, and its comprehensive tensile properties are obviously superior to those of alloys of the same grade and same type. The strengthening phases are nondestructively separated from the matrix of the ferromagnetic ODS iron-based alloy powder by electrolysis, and then analyzed independently, which can effectively avoid the damage caused by the ferromagnetic alloy powder to the electron microscope, and the problem that ferromagnetic alloy powder cannot be conveniently characterized by TEM/HRTEM is solved. At the same time, according to the observation results by present characterization method, combined with mechanical property test results, the optimization of the ODS alloy is achieved, especially the optimization design of multi-scale strengthening phases and final performance of the ODS alloy.

DETAILED DESCRIPTION OF THE EMBODIMENTS

Example 1: Preparation of Fe-14Cr-3W-0.4Ti-1.5$Y_2O_3$ (wt. %) Alloy Powder

Powder Preparation:

Step 1: A total of 150 g of a gas-atomized Fe-14Cr-3W-0.4Ti (wt. %) pre-alloyed iron-based powder and a $Y_2O_3$ powder was weighed according to a mass ratio of 98.5:1.5, and filled into a milling can. The particle size of the pre-alloyed iron-based powder was less than or equal to 150 μm, and the particle size of the $Y_2O_3$ powder was less than or equal to 45 μm. According to the ball-to-powder ratio of 10:1, 1500 g of milling balls with diameters of 20 mm, 15 mm, 10 mm, 8 mm, 5 mm and 3 mm respectively according to a mass ratio 1:1:1:1:1:1, was weighed and filled into the milling can.

Step 2: The milling can was sealed and vacuumed to a vacuum level of less than or equal to 0.1 Pa, and then filled with high-pure argon.

Step 3: Installing the milling can to a vertical planetary ball milling machine, and then mechanical milling. The parameters of the mechanical milling were set as follows: a rotating speed of 300 r/min, and a mechanical milling time of 60 hrs. The revolution and rotation directions were changed once per 30 min during ball milling.

Step 4: After the mechanical milling, the powder was sieved under an inert gas atmosphere in a glovebox to obtain the ODS powder.

Powder Characterization:

Step A: The prepared alloy powder and foam nickel (the pore diameter of the foam nickel is less than 200 μm) were soak into absolute ethanol, then dispersed by ultrasonic for 3 min to obtain foam nickel filled with the ferromagnetic ODS iron-based alloy powder.

Step B: The foam nickel filled with the ODS iron-based alloy powder was soaked into an electrolyte for electrolysis, to separate the strengthening phases from the iron-based alloy matrix, and magnetic separation was conducted by magnets to obtain an electrolyte containing the strengthening phase particles. The electrolyte for electrolysis was composed of the following components in percentage by mass: 2% of tetramethylammonium chloride, 15% of acetylacetone, 3% of glycerol, and the rest being absolute ethanol.

Step C: The electrolyte containing the strengthening phase particles prepared by electrolyzing was extracted and diluted with absolute ethanol by a factor of 5 to obtain a diluted suspension.

Step D: The diluted suspension was dispersed by ultrasonic for 3 min to obtain a solution containing nano-scale to submicron-scale strengthening phase particles for use.

Step E: The solution containing the nano-scale to submicron-scale strengthening phase particles for use was dripped onto an ultrathin carbon support film for 3 times, and dried to obtain an electron microscope test sample.

Step F: The powders before and after ball milling were observed by SEM; and the strengthening phase particles were characterized by using a TEM/HRTEM.

Figure 1:
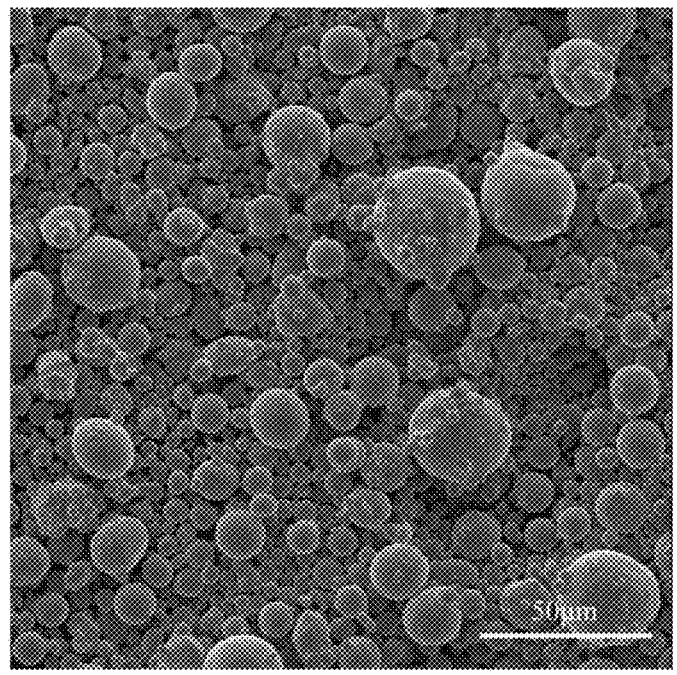
FIG. 1 presents a SEM image showing the microstructure of gas-atomized pre-alloyed powder used in Example 1 of the present disclosure.

FIG. 1 presents a SEM image of the gas-atomized pre-alloyed powder used in Example 1. It shows that the sphericity of the powder is good, and a small amount of special-shaped powder and some satellite powder appear.

Figure 2:
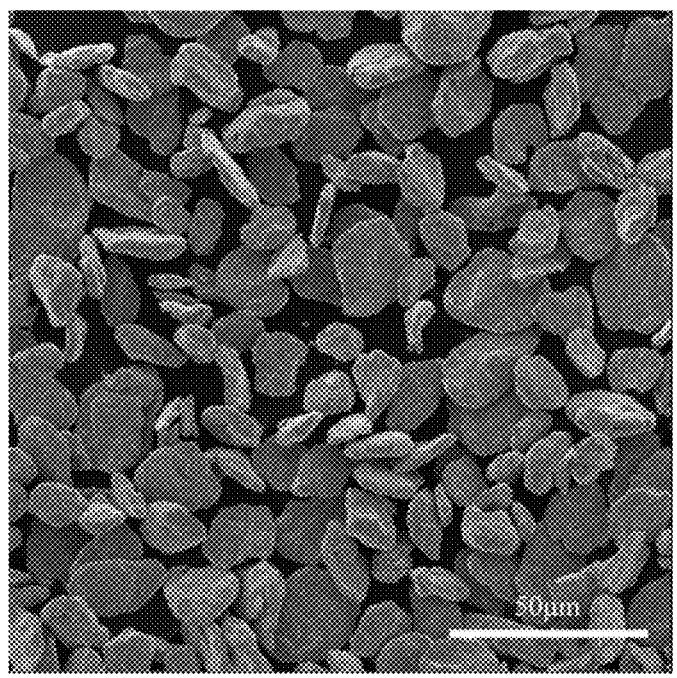
FIG. 2 presents a SEM image showing the microstructure of mechanical milled powder obtained in Example 1 of the present disclosure.

FIG. 2 presents a SEM image showing the microstructure of mechanical milled powder of Example 1. It shows that the powder changes to a flat shape after mechanical milling, and a large number of defects exist on the surface, which provides an effective structural basis for the formation of multi-scale oxides.

Figure 3:
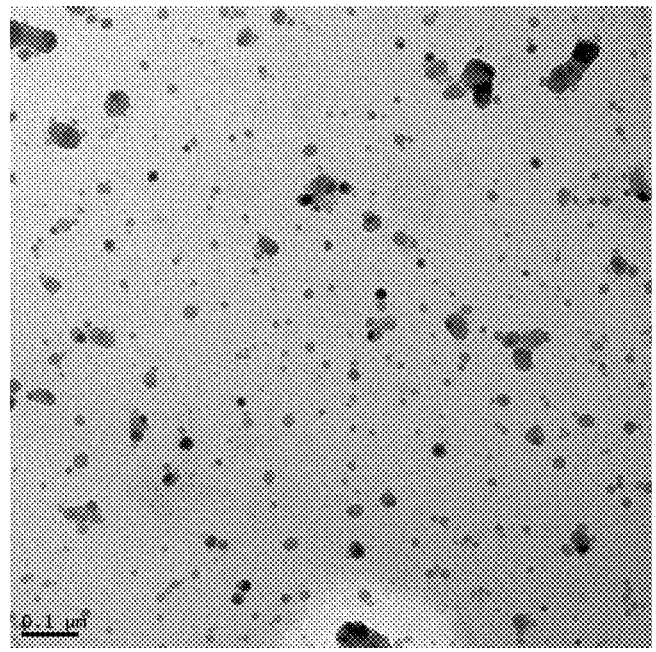
FIG. 3 presents a TEM image of a nanometer strengthening phase of the mechanical milled powder obtained in Example 1 of the present disclosure.

FIG. 3 presents a TEM image of a nanometer strengthening phase particles in Example 1, where the volume of particles A with a size of less than 50 nm accounts for 50% of the total volume of strengthening phase particles in the whole view. According to statistics of a large amount of TEM data in Example 1, the volume of strengthening phases with a size of less than 50 nm accounts for about 88% of the total volume of strengthening phases of the alloy powder.

Figure 4:
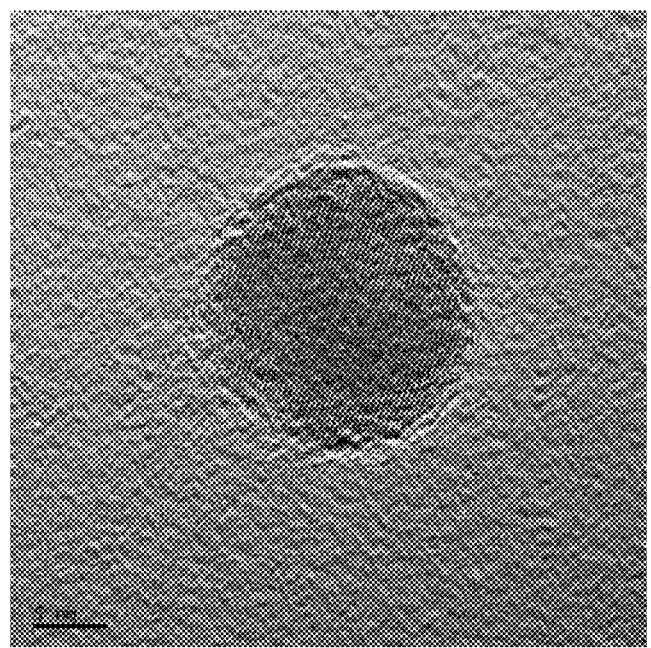
FIG. 4 presents a HRTEM image of the nanometer strengthening phase of the mechanical milled powder obtained in Example 1 of the present disclosure.

FIG. 4 presents a HRTEM image of a nanometer strengthening phase in Example 1. It shows that the size of nanometer strengthening phases is 15 nm, and a typical nano-scale structure is also shown.

Example 2: Preparation of Fe-14Cr-3W-0.4Ti-1.0Y$_2$O$_3$ (wt. %) Alloy Powder Powder Preparation:

Step 1: A total of 150 g of a gas-atomized Fe-14Cr-3W-0.4Ti (wt. %) pre-alloyed iron-based powder and a Y$_2$O$_3$ powder was weighed according to a mass ratio of 99:1, and filled into a milling can. The particle size of the pre-alloyed iron-based powder was less than or equal to 150 μm, and the particle size of the Y$_2$O$_3$ powder was less than or equal to 75 μm. According to a ball-to-powder ratio of 10:1, 1500 g of milling balls with diameters of 20 mm, 15 mm, 10 mm, 8 mm, 5 mm and 3 mm respectively according to a mass ratio 1:1:1:1:1:1 was weighed and filled into the milling can.

Step 2: The milling can was sealed and vacuumed to a vacuum level of less than or equal to 0.1 Pa, and then filled with high-pure argon.

Step 3: Installing the milling can to a vertical planetary ball milling machine, and then mechanical milling. The parameters of the mechanical milling were set as follows: a rotating speed of 320 r/min, and a mechanical milling time of 60 hrs. The revolution and rotation directions were changed once per 30 min during ball milling.

Step 4: After the mechanical milling, the powder was sieved under an inert gas atmosphere in a glovebox to obtain the ODS powder.

Powder Characterization:

Step A: The prepared alloy powder and foam nickel (the pore diameter of the foam nickel is less than 200 μm) were soaked into absolute ethanol, then dispersed by ultrasonic for 5 min to obtain foam nickel filled with the ferromagnetic ODS iron-based alloy powder.

Step B: The foam nickel filled with the ODS iron-based alloy powder was soaked into an electrolyte for electrolysis, to separate the strengthening phases from the iron-based alloy matrix, and magnetic separation was conducted by magnets to obtain an electrolyte containing the strengthening phase particles. Electrolyzing was carried out by applying a constant-voltage of 6 V at room temperature for 10 min. The electrolyte for electrolysis was composed of the following components in percentage by mass: 2% of tetramethylammonium chloride, 15% of acetylacetone, 5% of glycerol, and the rest being absolute ethanol.

Step C: The electrolyte containing the strengthening phase particles prepared by electrolyzing was extracted and diluted with absolute ethanol by a factor of 5 to obtain a diluted suspension.

Step D: The diluted suspension was dispersed by ultrasonic for 5 min to obtain a solution containing nano-scale to submicron-scale strengthening phase particles for use.

Step E: The solution containing the nano-scale to submicron-scale strengthening phase particles for use was dripped onto an ultrathin carbon support film for 3 times, and dried to obtain an electron microscope test sample.

Step F: The powders before and after ball milling were observed by SEM; and the strengthening phases were characterized using a TEM/HRTEM.

Figure 5:
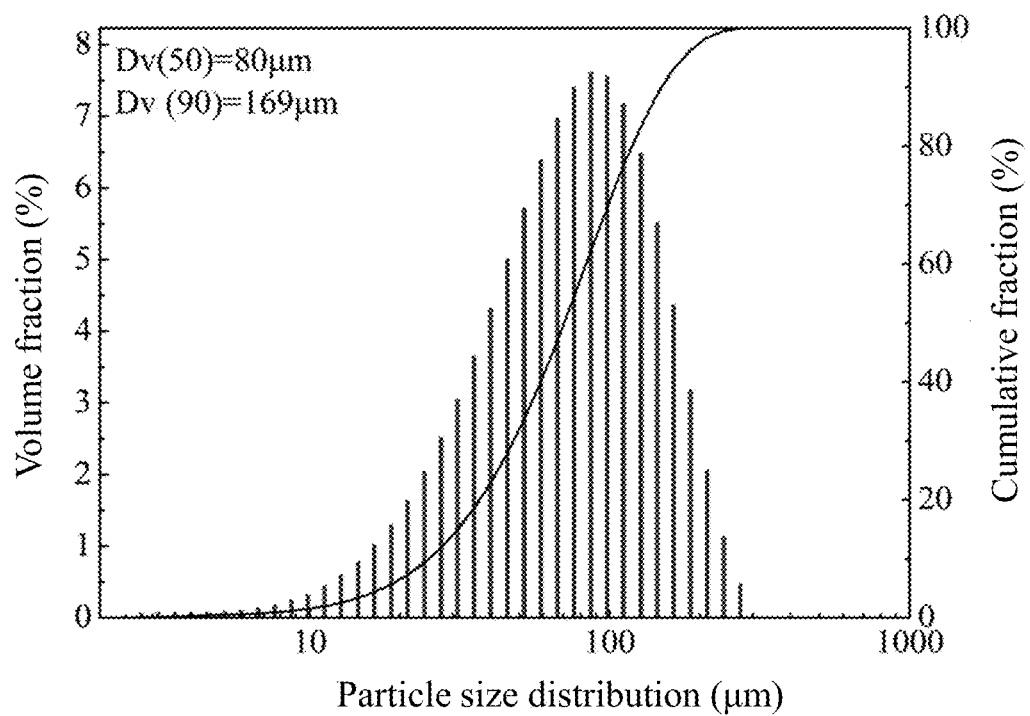
FIG. 5 presents a particle size distribution curve of mechanical milled powder obtained in Example 2 of the present disclosure.

FIG. 5 presents a particle size distribution curve of mechanical milled powder in Example 2, where the particle size of the powder is concentrative distribution, and the Dv(50)=46.3 μm.

Figure 6:
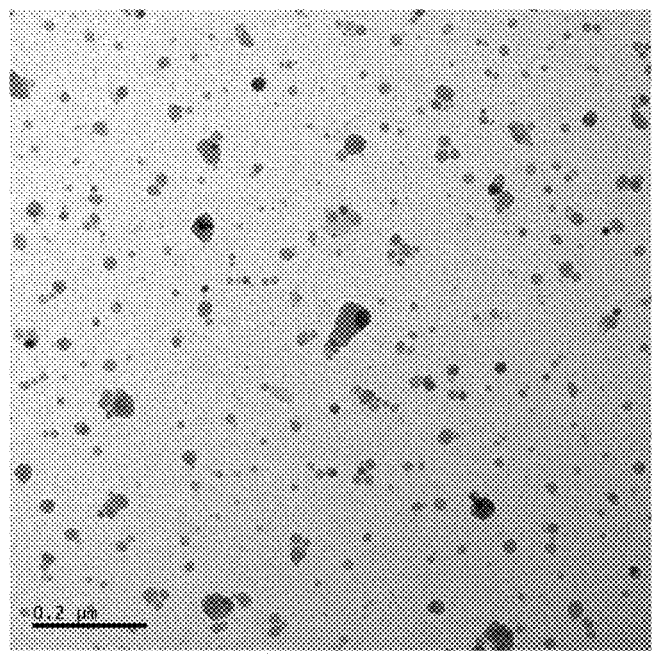
FIG. 6 presents a TEM image of a strengthening phase of the mechanical milled powder obtained in Example 2 of the present disclosure.

FIG. 6 presents a TEM image of a strengthening phase in Example 2. In FIG. 6, the size distribution of the strengthening phase particles is 2-50 nm, where the volume of particles A with a size of less than 50 nm accounts for 70% of the total volume of strengthening phase particles in the whole view. According to statistics of a large amount of TEM data in Example 2, the volume of particles A with a size of less than 50 nm accounts for about 92% of the total volume of strengthening phases of the alloy powder.

Figure 7:
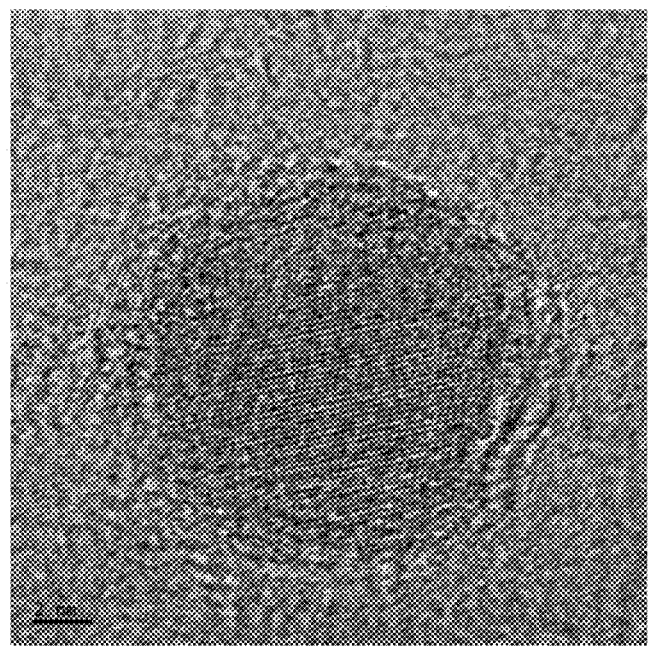
FIG. 7 presents a HRTEM image of a nanometer strengthening phase of the mechanical milled powder obtained in Example 2 of the present disclosure.

FIG. 7 presents a HRTEM image of a nanometer strengthening phase in Example 2. In FIG. 7, the size of nanometer strengthening phase particles is 20 nm, and a typical nano-scale structure is also shown.

Figure 8:
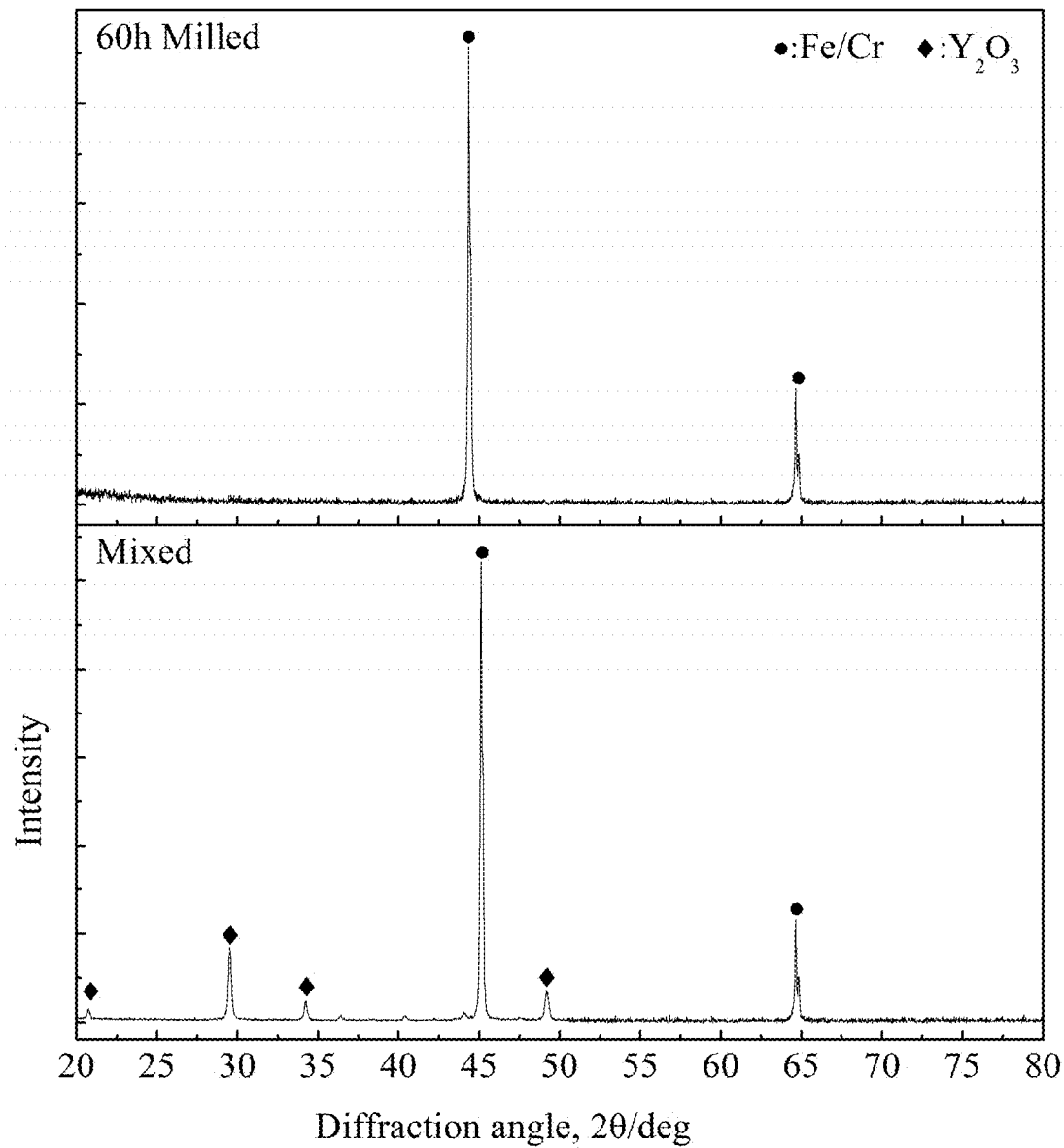
FIG. 8 presents a phase XRD analysis result of the mechanical milled powder obtained in Example 2 of the present disclosure. The result shows that the as-milled alloy powder without $Y_2O_3$ diffraction peak means that the $Y_2O_3$ is amorphized.

FIG. 8 presents a phase XRD analysis result of the mechanical milled powder obtained in Example 2. The result shows that the as-milled alloy powder without Y$_2$O$_3$ diffraction peak means that the Y$_2$O$_3$ is amorphized.

Comparative Example 1: Preparation of Fe-14Cr-3W-0.4Ti-1.0Y$_2$O$_3$ (wt. %) Alloy Powder Powder Preparation:

Step 1: The alloy powder had the same components as Example 1. Fe powder, Cr powder, W powder, Ti powder and Y$_2$O$_3$ powder with particle sizes of 4 μm, 63 μm, 10 μm, 45 μm and 45 μm respectively, were selected as raw materials. A total of 150 g of the raw materials was weighed and filled into a milling can; and 1500 g of milling balls with a diameter of 10 mm respectively was weighed according to a ball-to-material ratio of 10:1, and filled into the milling can.

Step 2: The milling can was sealed and vacuumed to a vacuum level of less than or equal to 0.1 Pa, and then filled with high-pure argon.

Step 3: Installing the milling can to a vertical planetary ball milling machine, and then mechanical milling. The parameters of the mechanical milling were as follows: a rotating speed of 300 r/min, and a mechanical milling time of 40 hrs. The revolution and rotation directions were changed once per 30 min during ball milling.

Step 4: After the mechanical milling, the powder was sieved under an inert gas atmosphere in a glovebox to obtain the ODS powder.

Powder characterization: The characterization method is the same as Example 1.

The result shows that a large amount of agglomerated powder with inhomogeneous element distribution appears in the mechanical alloyed powder, and even some non-alloyed powder appears.

The result shows that the volume of strengthening phases with a size of less than 50 nm in the powder accounts for about 20% of the total volume of strengthening phases of the alloy powder.

Example 3

The ODS iron-based alloy powder prepared in Example 1 was sequentially subjected to hot extrusion, hot rolling and heat treatment to prepare a multi-scale and multi-phase dispersion-strengthened iron-based alloy.

Alloy Bulk Preparation:

Step 1: The above ODS iron-based alloy powder prepared in Example 1 was filled into a pure-iron can, and vacuumed to 0.1 Pa or less. The gas pipe was seal welded. Hot extrusion was conducted at a temperature of 850° C., an extrusion speed of 15 mm/s, and an extrusion ratio of 10:1. Then the can was separated by wire-electrode cutting to obtain as-extruded ODS iron-based alloy.

Step 2: The as-extruded ODS iron-based alloy was hot rolled at a temperature of 850° C., and a total deformation of 80%.

Step 3: The hot-rolled ODS iron-based alloy was heat treated at a temperature of 950° C. for 1 hr, and air cooling to room temperature, to obtain a multi-scale and multi-phase dispersion-strengthened iron-based alloy.

The tensile strength of the alloy was 1680 MPa at room temperature and 620 MPa at 700° C., and the elongation was 10.85% at room temperature.

The inventor has also tried experiments using other sizes combinations of milling ball; however, mechanical properties of all products obtained by sequentially conducting hot extrusion, hot rolling and heat treatment of the fabricated powder (condition parameters are the same as those in Example 3) are obviously lower than that of Example 3.

Example 4

The ODS iron-based alloy powder prepared in Example 2 was sequentially subjected to hot extrusion, hot rolling and heat treatment to prepare a multi-scale and multi-phase dispersion-strengthened iron-based alloy.

Alloy Bulk Preparation:

Step 1: The above ODS iron-based alloy powder prepared in Example 2 was filled into a pure-iron can, and vacuumed to 0.1 Pa or less. The gas pipe was seal welded. Hot extrusion was conducted at a temperature of 950° C., an extrusion speed of 25 mm/s, and an extrusion ratio of 11:1. Then the can was separated by wire-electrode cutting to obtain as-extruded ODS iron-based alloy.

Step 2: The as-extruded ODS iron-based alloy was hot rolled at a temperature of 950° C., and a total deformation of 90%.

Step 3: The hot-rolled ODS iron-based alloy was heat treated at a temperature of 1050° C. for 1 hr, and air cooling to room temperature, to obtain a multi-scale and multi-phase dispersion-strengthened iron-based alloy.

The tensile strength of the alloy was 1620 MPa at room temperature, and 605 MPa at 700° C., and the elongation was 10.13% at room temperature.

Comparative Example 2

The other conditions in Comparative Example 2 were the same as those in Example 2, except that milling balls with diameters of 20 mm, 10 mm and 5 mm were matched according to a mass ratio of 1:1:1, to obtain iron-based alloy powder.

Alloy Bulk Preparation:

Step 1: The above ODS iron-based alloy powder prepared in Comparative Example 2 was filled into a pure-iron can, and vacuumed to 0.1 Pa or less. The gas pipe was seal welded. Hot extrusion was conducted at a temperature of 1200° C., an extrusion speed of 15 mm/s, and an extrusion ratio of 8:1. Then the can was separated by wire-electrode cutting to obtain as-extruded ODS iron-based alloy.

Step 2: The as-extruded ODS iron-based alloy was hot rolled to obtain a hot-rolled ODS iron-based alloy at a temperature of 950° C., a rolling speed of 0.36 m/s, and a total deformation of 80%.

Step 3: The hot-rolled ODS iron-based alloy was heat treated at a temperature of 1050° C. for 1 hr, and air cooling to room temperature, to obtain a multi-scale and multi-phase dispersion-strengthened iron-based alloy.

The size of strengthening phases of the alloy was 0.8-5 μm, the tensile strength was 1025 MPa at room temperature and 367 MPa at 700° C., and the elongation was 5.10% at room temperature.

What is claimed is:

1. A method for preparing a ODS iron-based alloy powder, comprising:

Step 1: weighing a pre-alloyed iron-based powder and a rare earth oxide powder containing $Y_2O_3$ according to a mass ratio of the pre-alloyed iron-based powder to the rare earth oxide powder containing $Y_2O_3$=97-99.5:3-0.5, taking milling balls according to a ratio of a total mass of powder materials to a mass of the milling balls=1:10-20, and filling the pre-alloyed iron-based powder, the rare earth oxide powder containing $Y_2O_3$ and the milling balls into a milling can, and closing the milling can, wherein the milling balls have diameters of 18-22 mm, 14-16 mm, 9-11 mm, 7-8.5 mm, 4.5-5.5 mm and 2.5-3.5 mm and are matched according to a mass ratio of 1-2:1-2:1-2:1-2:1-2:1-2;

Step 2: vacuuming the milling can to create a vacuum environment within the milling can, and then filling with an inert gas to create an inert gas atmosphere in the milling can;

Step 3: installing the vacuumed and filled milling can resulting from step 2 to a planetary ball milling machine, and mechanical milling, wherein parameters of the mechanical milling include a milling time of 40-120 hrs, and a milling rotating speed of 300-380 r/min; and Step 4: after the mechanical milling, sieving the powder under an inert gas atmosphere in a glovebox to obtain the ODS powder, wherein the ODS iron-based alloy powder comprises a matrix and strengthening phases; the strengthening phases comprise at least two types of strengthening phase particles with different sizes; the two types of the strengthening phase particles with different sizes are particle A and particle B, a size of the particle A is less than or equal to 50 nm, and a size of the particle B is larger than 50 nm and less than or equal to 200 nm, a volume of the particle A accounts for 85-95% of a total volume of all the strengthening phase particles, and a content of the strengthening phases is 0.5-3.0 wt. %, wherein the matrix is a Fe—Cr—W—Ti alloy, wherein the strengthening phases comprise crystalline $Y_2O_3$, amorphous $Y_2O_3$, Y—Ti—O, Y—Cr—O and Y—W—O.

2. The method of preparing the ODS iron-based alloy powder according to claim 1, wherein two gas nozzles are disposed on a lid of the milling can for vacuuming and filling with the inert gas after closing;

the inert gas is argon;

the ball milling machine is a vertical planetary ball milling machine or an omni-directional planetary ball milling machine, and revolution and rotation directions are changed once per 25-35 min during ball milling.

3. The method of preparing the ODS iron-based alloy powder according to claim 1, wherein a particle size of the rare earth oxide powder containing $Y_2O_3$ is less than or equal to 75 μm, and the pre-alloyed iron-based powder is Fe—Cr—W—Ti alloy powder with a particle size of less than or equal to 150 μm.

* * * * *